(No Model.)
F. D. CLARK.
CHECK HOOK.
No. 387,577. Patented Aug. 7, 1888.
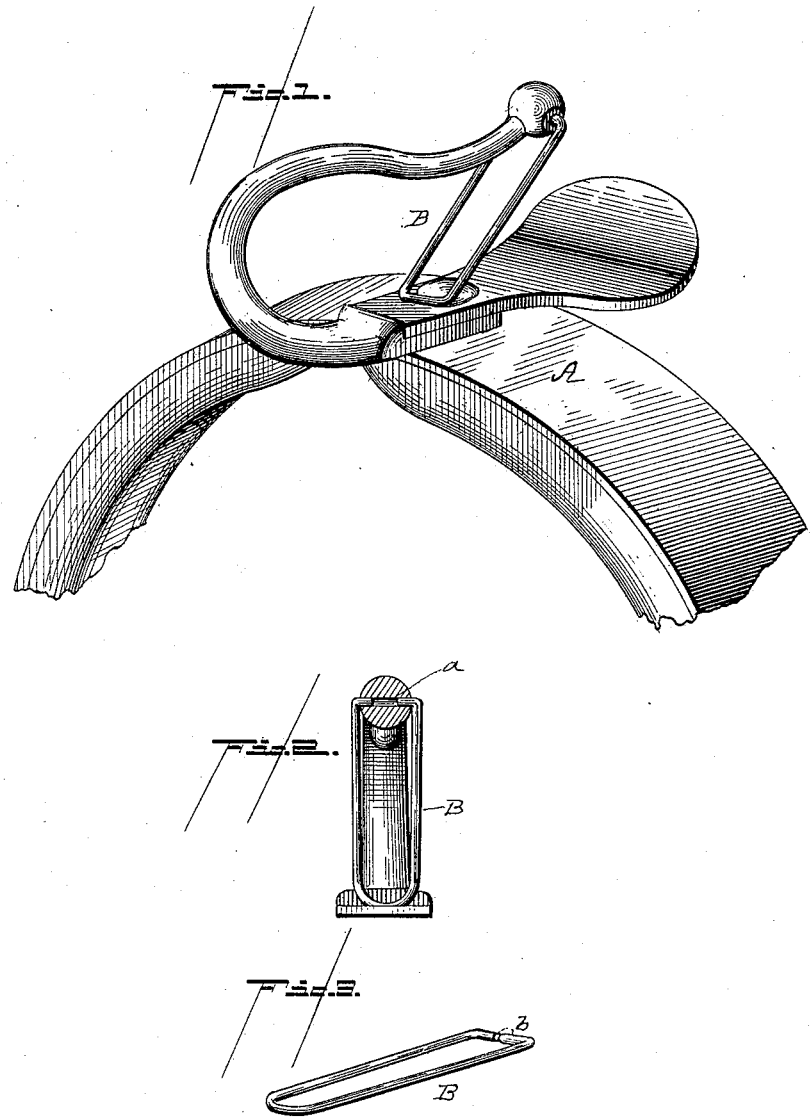
WITNESSES
Alex Mahon.
O. C. Luuth.
INVENTOR,
F. D. Clark,
By L. M. Ginsabaugh,
Attorney.
N. PETERS, Photo-Lithographer, Washington, D. C.

UNITED STATES PATENT OFFICE.

FRANCIS D. CLARK, OF SINCLAIRVILLE, NEW YORK, ASSIGNOR OF ONE-HALF TO FRANK E. SHAW, OF SAME PLACE.

CHECK-HOOK.

SPECIFICATION forming part of Letters Patent No. 387,577, dated August 7, 1888.

Application filed May 21, 1888. Serial No. 274,545. (No model.)

*To all whom it may concern:*

Be it known that I, FRANCIS D. CLARK, a citizen of the United States of America, residing at Sinclairville, in the county of Chautauqua and State of New York, have invented certain new and useful Improvements in Check-Hooks, of which the following is a specification, reference being had therein to the accompanying drawings.

My invention relates to check-hooks.

The invention consists in the combination, with the check-hook, of a gravity stop or dog made in elongated rectangular form with its open ends bent to engage perforations formed in the end of the check-hook.

In the accompanying drawings, Figure 1 is a perspective view of a portion of the gig-saddle and check-hook applied with my improved stop. Fig. 2 is a transverse section through the check-hook, taken from the rear. Fig. 3 is a perspective view of the improved stop or dog.

A represents a section of the gig-saddle with an ordinary form of check-hook secured thereto in any usual or preferred way. The rear end of the hook portion is either provided with a transverse perforation, $a$, or with recesses, forming pivotal bearings for the dog or stop, which will now be described.

The stop or dog B is preferably made of brass spring-wire or similar material, and bent in elongated, rectangular, or U form, with the open ends bent inward, as shown at $b$, to engage the perforations or recesses $a$ in the hook and form a free hinge-connection between them. The stop or dog B is of such length as to extend forward on an incline and rest on the base of the check-hook.

By this construction of locking dog or stop it will be readily seen that while the check-rein can be easily slipped into position, as the dog falls by gravity and inclines backward and upward from the base to the end of the hook, the checkrein cannot become accidentally disconnected. It will also be observed that by making the stop or dog of brass or similar spring-wire it can be made very cheaply, and can be applied readily to most all of the present forms of check-hooks by simply drilling the ends to form the bearings $a$, and also that the device can be easily detached for any purpose by simply drawing the ends $b$ apart in a manner that will be readily understood.

Having now described my invention, what I claim as new is—

A checkrein holder and stop consisting of a hook having the perforations or indentations $a$ in the point of the hook, in combination with the open link B, detachably secured in said perforation at one end, while the other end rests upon the main body of the hook to form a stop for the rein, as set forth.

In testimony whereof I affix my signature in presence of two witnesses.

FRANCIS D. CLARK.

Witnesses:
 J. M. EDSON,
 EMILY A. EDSON.